(12) United States Patent
Vanheuverzwyn (10) Patent No.: US 8,429,266 B2
(45) Date of Patent: Apr. 23, 2013

(54) SYSTEM FOR MEASURING AUDIENCE OF MEDIA ON AT LEAST ONE INTERNET COMMUNICATION NETWORK

(75) Inventor: Aurelie Vanheuverzwyn, Clichy (FR)

(73) Assignee: Mediametrie, Lavallois-Perret (FR)

( * ) Notice: Subject to any disclaimer, the term of this patent is extended or adjusted under 35 U.S.C. 154(b) by 1825 days.

(21) Appl. No.: 11/702,541

(22) Filed: Feb. 6, 2007

(65) Prior Publication Data
US 2007/0186227 A1   Aug. 9, 2007

(30) Foreign Application Priority Data

Feb. 7, 2006   (FR) ...................................... 06 50422

(51) Int. Cl.
*G06F 15/173*   (2006.01)
*G06Q 30/00*   (2012.01)
(52) U.S. Cl.
USPC ...................................... 709/224; 705/14.49

(58) Field of Classification Search .......... 709/224–227; 705/14.49–14.53; 706/21
See application file for complete search history.

(56) References Cited

U.S. PATENT DOCUMENTS 8,150,732 B2 *   4/2012   Beyda et al. ................ 705/14.49

* cited by examiner

*Primary Examiner* — Chirag R Patel
(74) *Attorney, Agent, or Firm* — Young & Thompson

(57) ABSTRACT

The present invention relates to a system for measuring audience of media on at least one communication network like an Internet communication network.

The audience measurement system operates on a collection of networks comprising at least one communication network. A plurality of predetermined users is associated with a first suite of machines (D, LT) connected to a network of the said collection of networks, in a first zone of use and with at least one second suite of machines (AL) connected to a network of the said collection of networks, in a second zone of use.

The system of the invention consists in that a calculation means (M1-M5) is designed to produce, on the basis of the first suite of machines, user counterparts for at least one other zone of use (AL) so as to reconstitute the plurality of the users.

4 Claims, 6 Drawing Sheets

SYSTEM FOR MEASURING AUDIENCE OF MEDIA ON AT LEAST ONE INTERNET COMMUNICATION NETWORK

The present invention relates to a system for measuring audience of media on at least one communication network like an Internet communication network.

In the state of the art, it is known to carry out audience measurement on the basis of a group of users of a determined medium or according to another point of view of the invention, on the basis of a panel of individuals having access to a determined medium. Each user of the group or individual of the panel is selected on the basis of determined statistical criteria and adheres fully thereto of their own accord. A specialized apparatus installed at the premises of the user or individual of the panel makes it possible to detect the actions executed by the user and to meter them over a given time period. The specialized audience measurement apparatus is then connected to a centre for formulating statistics which makes it possible to provide statistical audience results for the determined medium measured with the aid of the specialized apparatuses which return audience data on the basis of the group of observed users.

This audience measurement technique is well known in the domain of traditional media constituted by television and radiobroadcasting in particular. However, a requirement has emerged to apply this audience measurement technique to other media like those which appear on the Internet network.

In the state of the art, it has already been proposed to carry out a detection of the actions of any user of a website offering a content with the aid of small files installed on the machine of the user and which are created there with the aid of short programs inserted into the content that the user requests by connecting to the content provider site. Such files, dubbed "cookies", can be edited by an application executed on the content server site so that the actions previously executed on the site by the user who logs on are picked up again so as to prepare a faster and better targeted dispatch of contents for the attention thereof.

However, because in particular of policies of confidentiality and of regulations relating to individual rights, it is not possible to obtain information analogous to that emanating from an audience study carried out on a radiobroadcast traditional medium.

In the state of the art, it has also been proposed to insert into the contents requested by the browser of a user of an Internet site markers which are small programs or scripts with the aid of which it is possible to collect data associated with the use of a given machine and which are transferred to the site which has issued the marker. However, in this marker technique, as will be set forth later, it is not possible to exceed a certain level of analysis of personal data because in particular of the regulations in regard to protection of individual rights.

Such a technique of traffic measurement is said to be centred on the site which has issued the marker. However, such a technique does not make it possible to actually determine the audience elements associated with personal traits of a content user.

Moreover, in the technical area of audience measurement or of measurement of traffic on communication networks, a user or the behaviour of a user of the network on a given machine is represented by a computer object like a data table according to a predetermined data form or structure. Hereinafter, the term user will be taken according to the context or else as referring to a determined individual or else as referring to the representation thereof in the form of a computer object like a data table of use of at least one machine connected to at least one determined communication network.

Moreover, it has been appreciated that each user of the medium was able to log onto a determined medium or else through another network, or else to another machine on the same network. Particularly when this individual belongs to a traditional panel, the usages thereof do not then use the whole audience measurement apparatus. The various usages have therefore been analysed by distinguishing the logon places and the individuals who use the communication networks of these logon places. It has been appreciated that the audience measurement devices did not make it possible to take account of the individuals who log on in at least two different places, on the same network or on different networks. For example; audience measurement by panel is restricted to accesses to media that are limited in terms of number of users (exclusion of self-service PCs, Internet cafes, etc) in the application to the so-called Internet communication network.

It is an advantage of the present invention to propose a system making it possible to solve the drawbacks of the aforesaid prior art.

Specifically, the present invention relates to a system for measuring audience on a collection of networks comprising at least one communications network, in which a plurality of predetermined users is associated with a first suite of machines connected to a network of the said collection of networks, in a first zone of use and with at least one second suite of machines connected to a network of the said collection of networks, in a second zone of use.

The system of the invention consists in that a calculation means is designed to produce, on the basis of the first suite of machines, user counterparts for at least one other zone of use so as to reconstitute the plurality of the users.

According to an aspect of the invention, the audience measurement system comprises a first component which comprises means for producing data for scaling by zone of use on the basis of a declarative measurement of use of the medium by zone of use over a time period that is given on the basis of a sample of users of the medium.

According to an aspect of the invention, the audience measurement system comprises a second component which comprises means for producing a list of theoretical frequencies of use of the medium on the other zones of use on the basis of the scaling data produced by the said first component and on the basis of data {NV_s(i), NP_s(i); i, s} grouping together the number of visits NV_s(i) and the number of pages viewed NP_s(i) for each user i of the analysed sample with reference to the site s, the base being produced by an audience measurement system centred on the user.

According to an aspect of the invention, the audience measurement system comprises a third component for executing a balanced picking of user counterparts forming part of a zone of use not covered by an audience measurement system centred on the user from among the user members of the panel which comprises a first module for formatting according to a determined format of the individual data and of the database {NV_s(i), NP_s(i); i; s} grouping together the number of visits NV_s(i) and the number of pages viewed NP_s(i) for each user i of the analysed sample produced by an audience measurement system centred on the user and for a given medium s, as well as means for producing a recovery of individual data of the said counterparts so that a means for concatenating the aforesaid data produces files of individual data integrating the individuals of the said zone of the counterparts.

According to an aspect of the invention, the audience measurement system comprises a fourth component which processes the data emanating from the first and second components so as to determine the users situated at the intersection of the zone of use covered by an audience measurement system centred on the user and of the other zones of use and in calculating a survey rate allowing the random selection of records of the initial database so as to produce individual data integrating the audience data from the other zones of use of the users situated at the intersection of the zone of use covered by an audience measurement system centred on the user and of the other zones of use.

According to an aspect of the invention, the audience measurement system comprises a fifth component for carrying out a tuning of the results calculated on the basis of the database emanating from the third and fourth components emanating from an audience measurement system centred on the user on those originating from a traffic measurement system centred on the site so as to produce an audience database for a plurality of Internet sites taking account of the set of domains of use of the medium.

Other advantages and characteristics will be better understood with the aid of the description and of the appended figures among which.

Subsequently in the text, according to the context we shall use the notion of audience measurement when it involves use relating to a determinable user, and of traffic measurement when the user is not directly identifiable. However, the term audience measurement will be understood as also applying if appropriate to the term traffic measurement. The term zone of use indicates according to the context the domain of activity on at least one communication network on which is broadcast or made available a medium like an editorial content, or the users undertaking an activity in all or part of a zone of use, for example users simultaneously belonging to the characteristics of the users of different zones of use. A communication network can for example be made up of a network according to a determined technique, for example the Internet network composed of a plurality of sites for supplying contents or streaming broadcasts, but also the relation of such a network by way of a gateway like the Internet network reached from a cellular telephone network for example like the GSM network, or else like a telebroadcasting network relayed by a gateway on the Internet network.

Figure 1:
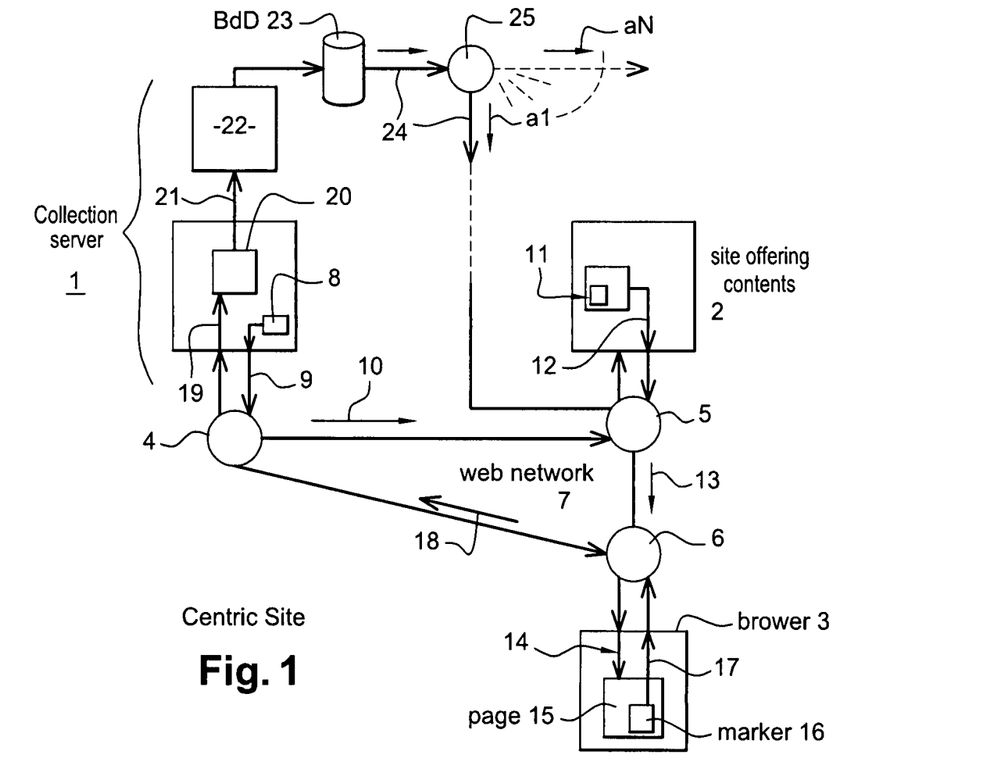
FIG. 1 represents a prior art system making it possible to follow the activities from a content provider site to an arbitrary user.

In FIG. 1 is represented a traffic measurement system based on the technique of markers as is known in the prior art.

A traffic collection and measurement server 1 is connected by a means of connection 4 to the Internet network 7 for at least one producer of contents 2 that has established a site making it possible to offer contents to users like the user 3. The user 3 has available a piece of software dubbed a "browser", which is furnished with resources for locally executing small programs, often called "scripts", which make it possible to detect a certain number of actions conducted by the user when he is connected to a content offerer site 2.

To this end, the traffic collection and measurement server 1 has available a resource 8 for producing markers, in the form of scripts which are suited to the traffic measurement data that the content offerer site desires to ascertain.

While the editor of the content offerer site 2 adheres to a traffic measurement contract with the operator of the traffic collection and measurement server 1 likened here to audience measurement, the resource 8 for producing markers receives a certain amount of data capable of preparing the markers intended to be inserted into at least one page of the content offerer site 2. To this effect, during a loading request procedure, a marker 9 is downloaded to the content offerer site and, with the aid of a suitable editing tool at the premises of the content offerer site 2, the marker is inserted during an operation for inserting markers 11 into the target page.

During a request for access to the page presented by an arbitrary user furnished with a browser 3, the page is downloaded according to the path 12 through a resource for access to the Internet network 5 available on the production site and through the means of access to the Internet 6 associated with the requesting user, the requested page is downloaded into the browser 3 in the form of a consultable page 15. On this page, the user can execute a certain number of actions like:

clicking on a hypertext link;
entering a form field;
moving the mouse over a zone like an image; etc.

During the downloading of the page 15, the browser 3 decodes the marker 16 inserted into the page and compiles it as a function of the actions which are so many events that the executable code inscribed in the marker is capable of detecting and of reporting in the form of data which can be returned according to a diagram 17 in an HTTP request, for example, or else destined for the contents producer 2, or very preferably, in the case of traffic measurement, to the traffic collection and measurement server 1.

In this second case, which corresponds to the state of the art of the present invention, the data inscribed in the marker are transmitted via the path 18 towards the access resource 4 of the traffic collection and measurement server 1 so that the marker comprising the traffic measurement characteristic data is compiled in a resource 20 for compiling traffic measurement data associated at one and the same time with the content offerer site 2, on the one hand, and with the browser 3 having retransmitted the marker data, on the other hand.

The whole set of data which are then gathered by the traffic collection and measurement server 1, originating from all the users of the content offerer site 2, but also from all the users of the other sites (not represented) offering contents and subscribing to the traffic measurement server 1, are then downloaded via an internal downloading link to a statistical processor 22 which utilizes the data compiled in the resource 20 by applying statistical processings to them, the results of which are transferred into a database 23 which is then periodically updated, for example every day or every hour. On completion of a traffic measurement data compilation period, a resource 24 for providing traffic measurements is then connected with the aid of a convenient link, like the Internet network itself, with the aid of a connection resource 25 to the set of subscribers a1 ... aN, who each retain at least one content provider site like the site 2 whose pages carry markers originating from traffic measurement server 1.

As was described above, such a traffic measurement is directed to a module for using traffic data of the content provider sites, but does not give any indication relating to the personal characteristics of the users who have logged on and who have made requests to consult the contents of the subscribers of the traffic measurement server 1.

Specifically, the data collected are associated with the browsers of the users and not with the users themselves. A user using several browsers will consequently not be able to be identified as unique. Moreover, it is not permissible to detect personal data without the knowledge of the users and it follows from this that the quantity and the relevance of the data which make it possible to characterize the activities of the users on the medium constituted by the Internet network are extremely reduced.

It follows from this that the content editors have available insufficient information to orient the editorial policy of the contents destined for the customary users or else that it is almost ineffective to carry out organizations of advertisement campaigns if one seeks to adapt them to real individuals.

Figure 2:
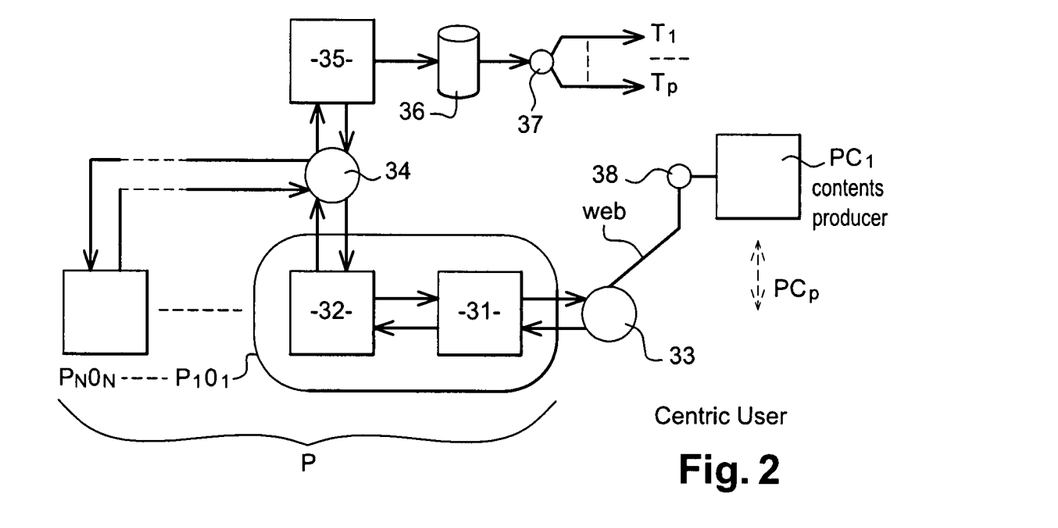
FIG. 2 represents a prior art system making it possible to follow the activities of a person who is a member of a group of predetermined users towards an indeterminate number of content provider sites.

In another state of the art, an embodiment of which is represented in FIG. 2, an institute for audience measurement has carried out the training of a group of users by using the statistical techniques for training representative panels as is known in audience measurement on traditional media.

In FIG. 2 have been represented several users belonging to the group of users constituting the audience measurement panel P, the users each possessing one or more Internet access stations $P_1O_1$ to $P_NO_N$, if there are N users in the panel P. Each user station like the station $P_1O_1$ comprises as is known a resource for access 33 to the Internet network via which is connected at least one browser 31 which is under the control of a piece of software 32 which is executed on the processor of the workstations so that the actions of the user whose personal parameters have been taken into account during the training of the panel, are themselves returned by a resource for access 34 to a connection network to the institute for audience measurement.

The institute for audience measurement possesses a set 35 of processing treatments of the actions recorded by the software for measuring activity of the various stations $P_1O_1$ to $P_NO_N$ which are connected to it via an access resource 34 as was stated above.

As is known, the set 35 of processing treatments of the actions recorded by the activity measurement software is connected to a database 36 which stores the results produced according to known statistical procedures of audience measurement. The determination of the audience results is periodically reported by an audience report generation means 37. The audience report is then broadcast to the subscribers $T_1$ to $T_P$.

When a user member of the panel P, like the user $P_1$, logs on via his Internet resource for access 33 to the site PC1 of the various content producers present on the Web like PC1 to PCP, the logon actions executed thereby are detected by the piece of software 32 which records activity data and transmits them to the set 35 for processing activity data.

On the other hand, if a user who is not a member of the panel P were to log on to the site 51, the institute for audience measurement 34-37 does not, of course, meter his activities.

Figure 3:
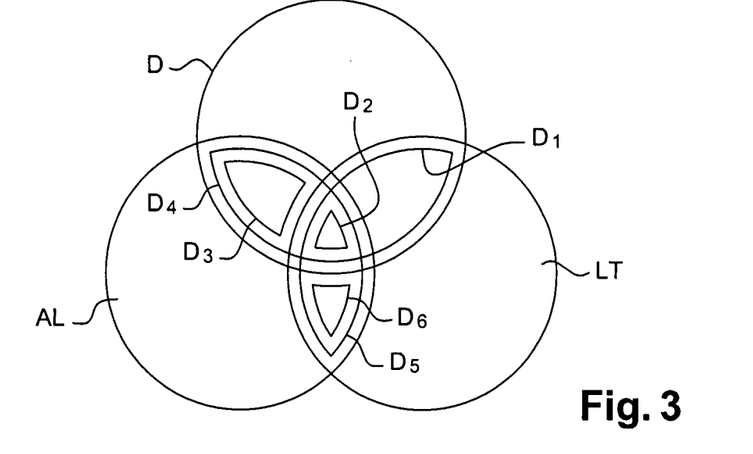
FIG. 3 represents a partition of the population of the users according to the zones of use of the medium making it possible to understand the invention.

In FIG. 3 is represented a distribution of the users of the group of predetermined users implemented in the invention.

On account of the speciality of the Internet medium, the users, members of the panel or of the group of predetermined users are physical people who are distributed into several zones of use, or as was defined above of domains of use of the media broadcast on the Internet network and which are mainly:

the domain of domestic use D in which a personal user consults contents on the Internet from a computer connected to his residence; and the domain of professional use LT in which a personal user consults contents on the Internet from a computer connected to his work place.

In a refined analysis according to the invention, a third domain AL has been determined which consists of the other places which are therefore neither of the domain D of domestic use, nor of the domain LT of professional use. It concerns the domain of use in other places. As has been represented graphically, certain users who belong to a domain of determined use can also belong to one or the other of the other domains taken into account in the audience measurement. Particularly for the users belonging to the domain D of domestic use or to the domain LT on the work places of professional use, they may possibly access the Internet in the domain of use AL. In this case, their use of the Internet on the domain of use AL is not taken into account in the state of the art in the audience measurement system centred on the user such as represented in FIG. 2, thereby limiting the field of the audience measurement on the group of predetermined users to their origin domain D or LT.

According to an essential characteristic of the invention, to make it possible to meter in the audience measurement users who are not in a situation of customary declared use in one of the domains D or LT, the construction of counterparts of the exclusive Internet users on the domain of use AL is carried out with the aid of a resource for creating counterparts.

The principal steps followed by the audience measurement system according to the invention will now be described with the aid of FIG. 4.

The objective is to produce a unique audience measurement representing the whole set of logon places associated with at least two domains like the domains described with the aid of FIG. 3, over a given territory like a national territory, while preserving the advantages of the audience measurement systems related to the observation of the individual behaviours over the whole set of Internet sites.

Another objective of the system of the invention is to integrate a process for producing audience reports which must be produced so as to allow the editorial and advertising management of the measured sites. Specifically, it is as a function of statistical indicators and of their variations that a producer of contents is capable of modifying the content made available to the users of the Internet sites so as to improve the audience thereof. It follows from this that the processing of the data collected at the panel of users, as well as the processing proper of the system of the invention making it possible to take account of uses outside the zone of predetermined use of the panel, must be performed according to the same periodicity.

The audience measurement system according to the invention comprises means making it possible, on the basis of at least two data sources relating to traffic measurement and/or to audience measurement for an Internet site or of a medium available or broadcast on another communications network as well as of an additional resource, to produce a file of individual data of the same format as that emanating from the audience measurement system centred on the user and which is representative of the whole set of domains grouping together the logon places over a given territory, like the national territory.

When an audience measurement system uses a predetermined group of users of Internet sites, in the state of the art as was set forth in particular with the aid of FIG. 2, two phenomena are not taken into account by such an audience measurement system:

- the Internet connections of the members of the panel or predetermined group of users from Internet domains of use which are not equipped with the audience measurement resources characteristic of the audience measurement system on a predetermined group of Internet site users; and
- the set of Internet connections produced by the individuals connecting to the Internet exclusively from Internet domains of use which are not equipped with the audience measuring resources characteristic of the audience measuring system on a predetermined group of Internet site users.

In FIG. 3 are represented three domains which are respectively:

- the domain D of the users of the predetermined group of users who connect to the Internet by way of a machine at the residence;
- the domain LT of the users who connect by way of a machine at the work place; and
- the domain AL of the users, whether or not they belong to the predetermined group of users, and who connect to machines which are neither at the residence nor at the work place.

We thus determine at least six zones of intersection of domains which are:

- the zone D1 of the members of the domain D of the residence who also operate from the domain LT of the work places;
- the zone D5 of the members of the domain LT of the work places who also operate on the domain AL of the other places;
- the zone D4 of the members of the domain AL of the other places who also operate in the domain D of the residence;
- the zone D2, internal to the zone D1, of the members of the domain D of the residence who operate from the domain LT of the work places, but also from the domain AL of the other places;
- the zone D3, internal to the zone D4, of the members operating only from the domain AL of the other places and the domain D of the residence;
- the zone D6, internal to the zone D5, of the members who operate only from the domain LT of the work places and the domain AL of the other places.

Figure 4:
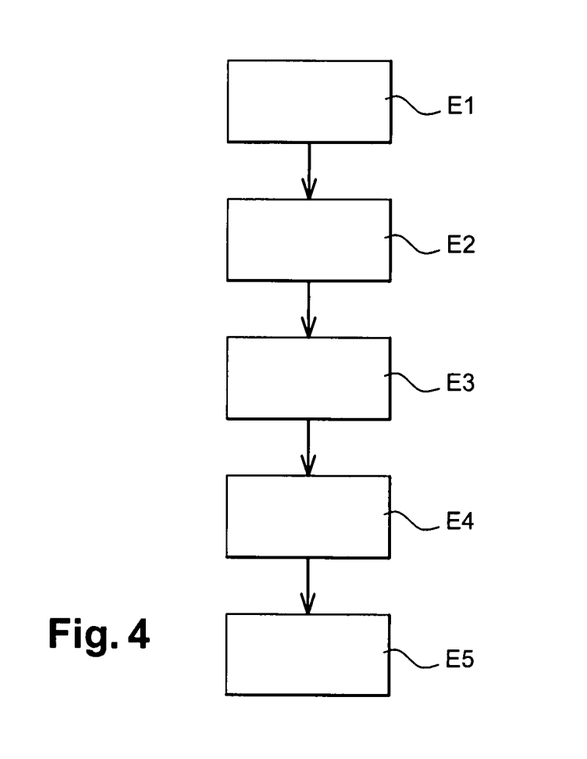
FIG. 4 represents a flowchart of the successive processings that the system of the invention applies.

To alleviate the limits of the audience measurement system in the state of the art as was set forth in particular with the aid of FIG. 2, the audience measurement system of the invention executes a processing of five steps which are summarized in the flowchart of FIG. 4.

In step E1, scaling data is produced; then in step E2, the calculation of theoretical structures is executed; then in step E3, the picking of user counterparts forming part of a domain not covered by an audience measurement system centred on the user from among the user members of the panel P is executed; then in step E4, the simulation is executed of the actions performed in domains which are not metered in an audience measurement system centred on the user by the users situated at the intersection of the domain covered by an audience measurement system centred on the user and of the other domains; and in step E5, the tuning is executed of the audience results produced on the basis of the individual database integrating the audience from the other domains on those produced by the measurement system centred on the site.

The provisions executed during the aforesaid five steps will now be made explicit by describing the components implemented in the audience measurement system of the invention for executing these processing steps.

Figure 5:
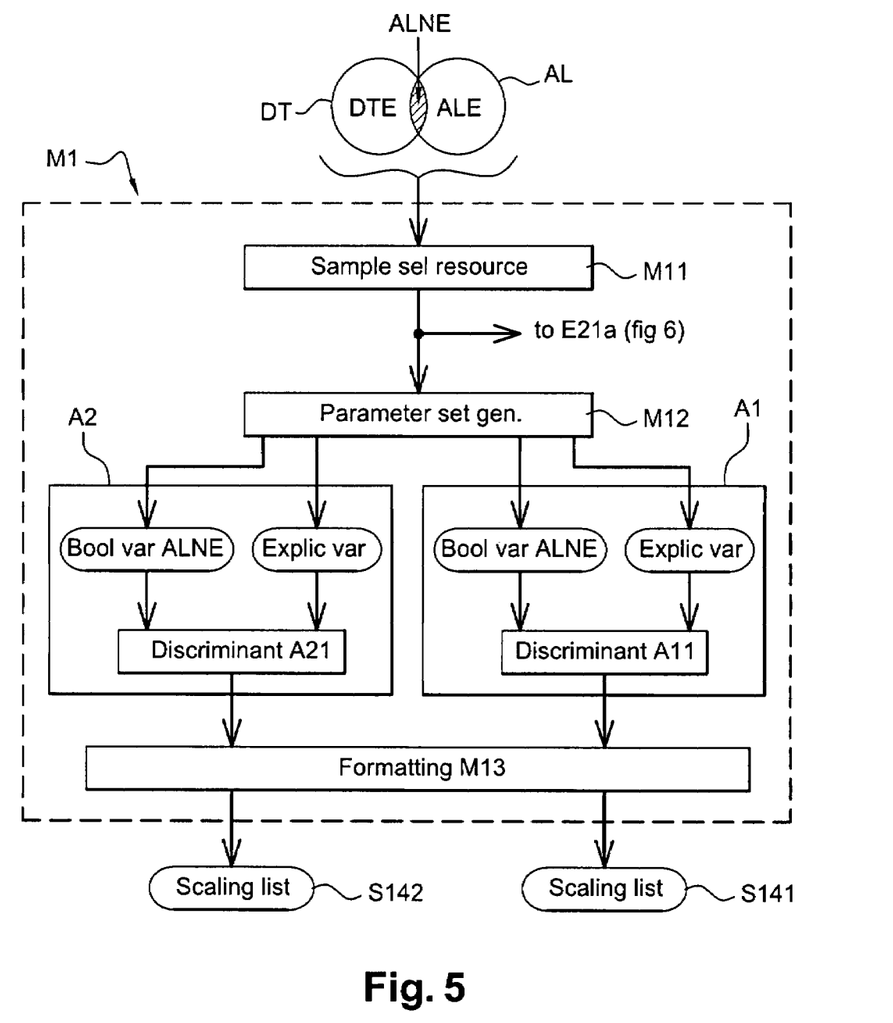
FIG. 5 represents an embodiment of a first component of the audience measurement system of the present invention according to a particular embodiment.

The audience measurement system of the invention comprises a first component for producing scaling data M1, represented in FIG. 5. The component for producing scaling data M1 consists of a means for characterizing the sociodemographic profiles and the Internet usages for each of the domains or zones taken into account in the chosen organization of the audience measurement.

In FIG. 5 is represented the source of the audience measurement data which are taken into account in an embodiment by the first component of the audience measurement system of the invention. This source of the data has been modelled in the form of principal domains, respectively the union DT of the domains D of the residence and LT of the work places and the domain of the other places, termed the domain AL. The intersection of the two domains represents the zone ALNE of the users who operate at one and the same time in the domain DT and in the domain AL while the zones DTE and ALE are zones in which the members operate exclusively on one of the domains. The invention is not limited to this distribution of domains, nor to the terminology of these domains.

The means for characterizing the sociodemographic profiles and the Internet usages for each of the domains or zones taken into account comprises a resource M11 for selecting a sample of Internet users, whose size is calculated in such a manner that each sub-population has a size greater than a predetermined minimum threshold. Preferably, the resource for selecting a sample of users comprises a means of contact making it possible to draw up a query form so as to fill in the measurable values which will be described further on. The first component M1 also comprises a means M12 for producing a determined set of measurable parameters making it possible to specify the sociodemographic profile and the Internet usage for each individual of the sample.

The means for characterizing the sociodemographic profiles and the Internet usages for each of the domains or zones taken into account thereafter comprises a resource A1 for conducting a first analysis for determining the discriminating characteristics making it possible to differentiate the individuals of the zone ALE from the individuals of the domain DT.

In an exemplary embodiment, the resource A1 for conducting a first analysis comprises a means A11 for carrying out a discriminatory analysis on a sub-sample containing the zones ALE and DT. The means for isolating explanatory variables makes it possible to apply known statistical procedures of discriminatory analysis to a variable of Boolean type ALE and to the variables of sociodemographic profile and of Internet usages on the basis of the measurable parameters of the sociodemographic profile and of the Internet usage produced by the means M12.

The means for characterizing the sociodemographic profiles and the Internet usages for each of the domains or zones taken into account thereafter comprises a resource A2 for conducting a second analysis for determining a variable for differentiating between two zones or domains, like a differentiation between the zones ALNE and DTE in terms of sociodemographic profile and of Internet usages in the zone of use DT common to the individuals of the zones ALNE and DTE.

In an exemplary embodiment, the resource for conducting a second analysis comprises a means A21 for carrying out a discriminatory analysis on a sub-sample containing the zones ALNE and the zones DTE. The means for isolating explanatory variables consists in applying known statistical procedures of discriminatory analysis to a variable of Boolean type ALNE and to the variables of sociodemographic profile and of Internet usages in the zone DT.

The first component for producing scaling data finally comprises a resource M13 for generating according to a predetermined data format the lists S141 and S142 of the discriminatory variables of the behaviours of the individuals characteristic of the respective zones ALE and ALNE. These lists S141 and S142 constitute the scaling data within the sense of the invention. They comprise in particular the profile data of the users of zones of type ALE and the profile data of the zones of type ALNE.

The audience measurement system of the invention comprises a second component M2 for consistency matching of the scaling data S141 and S142 emanating from the first component M1 with the data emanating from the audience measurements centred on the users by means of a system of the kind represented in FIG. 2. A particular embodiment of the second component of the audience measurement system of the invention has been described with the aid of FIG. 6.

The second component M2 for consistency matching of the scaling data receives the formatted lists S141 and S142 of the characteristic data of the users emanating from the first component M1, as well as a formatted list of the characteristic data of the audience measurements centred on the users according to the principle of an audience measurement system according to FIG. 2.

Figure 6:
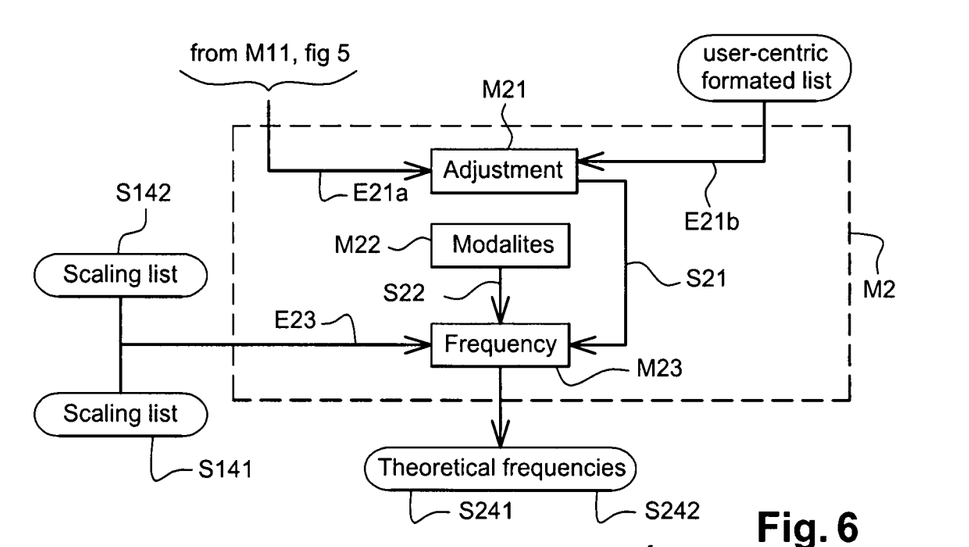
FIG. 6 represents an embodiment of a second component of the audience measurement system of the present invention according to a particular embodiment.

The second component M2 produces at the output the lists S241 and S242 of theoretical frequencies of characteristic Internet usages of the users of the respective zones ALE and ALNE, these theoretical frequencies of Internet usages being transmitted as input data for the third and fourth components, which will be described further on, of the audience measurement system of the invention.

The second component M2 essentially comprises a first module M21 which executes the calculation of adjustment coefficients for the data presented to its input respectively:
  an input E21*a* which taps off the declarative data of Internet use for the individuals belonging to the domain DT in the sample generated by the resource M11; and
  an input E21*b* which taps off data characteristic of the activity of the users of the domain DT emanating from the audience measurement system centred on the user of the kind of that represented in FIG. 2.

The adjustment coefficient produced by the first module M21 is calculated as the ratio of the usage rates measured by the audience measurement system centred on the user in the zone of use DT of the residence and of the work places for the population metered in the domain DT to the usage rates metered in the sample tapped off from this same population. The adjustment module M21 produces an adjustment coefficient for each measured datum characteristic of the predetermined sample of users.

The second component M2 thereafter comprises a second module M22 which makes it possible to determine modalities for the calculation of an Internet connection frequency variable. In the exemplary embodiment, the modalities are provided:
  for every day;
  for almost every day;
  two to three times per week; and
  one to three times per month.

Of course in other exemplary embodiments, there exist other modalities for the calculation of an Internet connection frequency variable.

The second component M2 thereafter comprises a third module M23 which makes it possible to determine the split in terms of number of connection days to be applied to the audience measurement system centred on the user so as to obtain a distribution of the connection frequencies in accordance with that emanating from the first component M1. Use is made of the theoretical frequencies of the usage for the populations of the domain DT and, on the basis of the split of the connection periods that is determined by the second module M22 for determining the modalities, the third module M23 determines the split in terms of number of days of in the zone DT of the residence and of the work places of the individuals belonging to this zone DT when they are measured by an audience measurement system centred on the user and which makes it possible to comply with the frequencies obtained E23 and S21 in the population sample determined previously for each modality of the connection frequency.

For example, if 50% of the individuals of the domain DT are metered for the connection "every day" modality (first modality determined in the second module M22) within the framework of a use of the Internet at the residence and/or in the work places, in the audience measurement system centred on the user, 50% of the individuals of the sample of predetermined users have logged on to the Internet between 15 and 31 days. The "every day" modality will therefore be associated with the slice "between 15 and 31 days" of the audience measurement system centred on the user.

Figure 7:
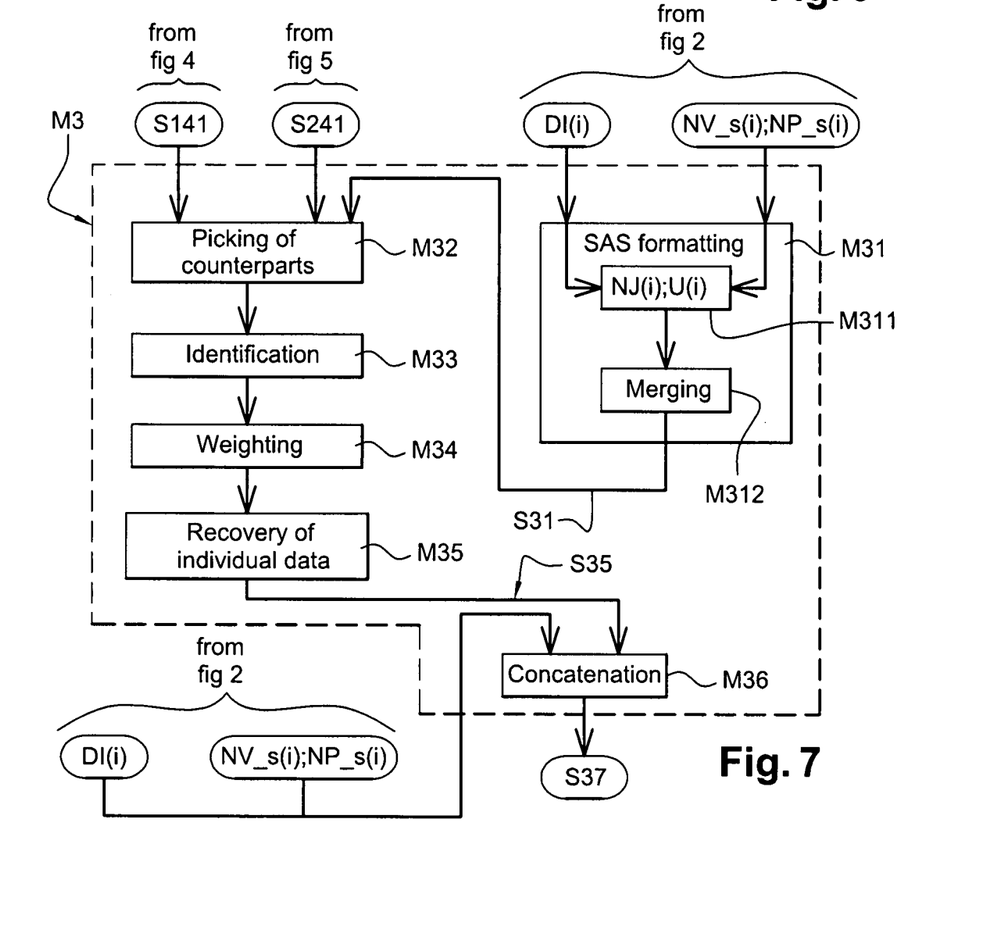
FIG. 7 represents an embodiment of a third component of the audience measurement system of the present invention according to a particular embodiment.

The audience measurement system of the invention comprises a third component M3 for searching among a part of the sample followed by an audience measurement system centred on the users, for the users whose sociodemographic profile and whose Internet audience behaviour is akin to that of the individuals of the zone ALE, that is to say who log on only from other places.

At the input of the third component M3, are found respectively:
  the formatted lists S141 and S142 emanating from the first component M1 (FIG. 5);
  the lists of the theoretical frequencies S241 and S242 emanating from the second component M2 (FIG. 6);
  a file of the individual data {DI(i); i} containing, for each individual of a predetermined group of users, the sociodemographic profile produced by an audience measurement system centred on the user of the type of that represented in FIG. 2; and
  a file of individual data {NV_s(i), NP_s(i); i; s} containing, for each individual i of a group of predetermined users, the number of visits NV_s(i) and the number of pages viewed NP_s(i) on each site s per dated day.

The third component M3 comprises a first module M31 for shaping the individual data making it possible to produce a table having a determined format, like a table in the format of the SAS (trademark) statistical processing workshop, usable for the other following modules. The first module M31 for shaping the individual data receives as input the individual data {DI(i); i} and {NV_s(i), NP_s(i); i; s}, produced by the audience measurement system centred on the user of the kind of that of FIG. 2. The first module M31 comprises a first calculation resource M311 for calculating, for each individual, the number of Internet connection days and a variable descriptive of the Internet usages in the course of the period t, determined by the modality chosen in the module M22 of the second component M2, for each of the discriminatory variables determined in the resource A21 of the first component M1.

On the basis of the calculation performed by the first calculation resource M311, the merging of the tables for each individual of profiles and of usages which have been calculated for each individual in the first resource M311 is executed thereafter in a second resource M312. The output of the first module M31 is then transmitted to an input of a module M32 of the third component which will be described further on.

The third component M3 comprises a second module M32 for performing the picking of counterparts of users of the domain ALE (see FIG. 5). In a particular embodiment, a balanced picking executed on the basis of known means is executed. At the input of the second module M32 are respectively provided the lists S141 of the theoretical values of profiles and of Internet usages of the users of the domain ALE, S241 of the theoretical frequencies emanating from the second component M32 and the file S31 emanating from the module M31.

At the output of the second module M32, the list S32 of the counterpart individuals to be duplicated in the files of individual data according to an essential characteristic of the present invention is provided.

The list S32 produced is transmitted to the input of a third module M33 for creating new identifiers to each counterpart in the list S32. The list of the counterparts S32 with the former and new identifiers and the data characterizing them is transmitted as input to a fourth module M34 executing a weighting as a function of the size of the sample of counterparts that was obtained in the preceding module M32 and of the theoretical proportion of individuals of the domain ALE within the set of users who logged on to the Internet in the course of the period t, determined by the determination resource for the first component M1.

The third component M3 comprises a fifth module M35 which executes the recovery of the individual data of the files or of the formatted lists, respectively $\{DI(i); i\}$ and $\{NV\_s(i), NP\_s(i); i; s\}$, produced by an audience measurement system centred on the user of the type of that represented in FIG. 2 and associates them with the new identifiers determined in the third module M33. The output list S35 of the fifth module M35 is transmitted to an input of the aforesaid sixth module M36 which executes the concatenation of the individual data S35 of the counterparts with the individual data $\{DI(i); i\}$ and $\{NV\_s(i), NP\_s(i); i; s\}$, produced by an audience measurement system centred on the user of the kind of that of FIG. 2.

New files S37 of individual data integrating the population of the individuals of the zone ALE are obtained at the output of the third component M3 (see FIG. 7).

Figure 8:
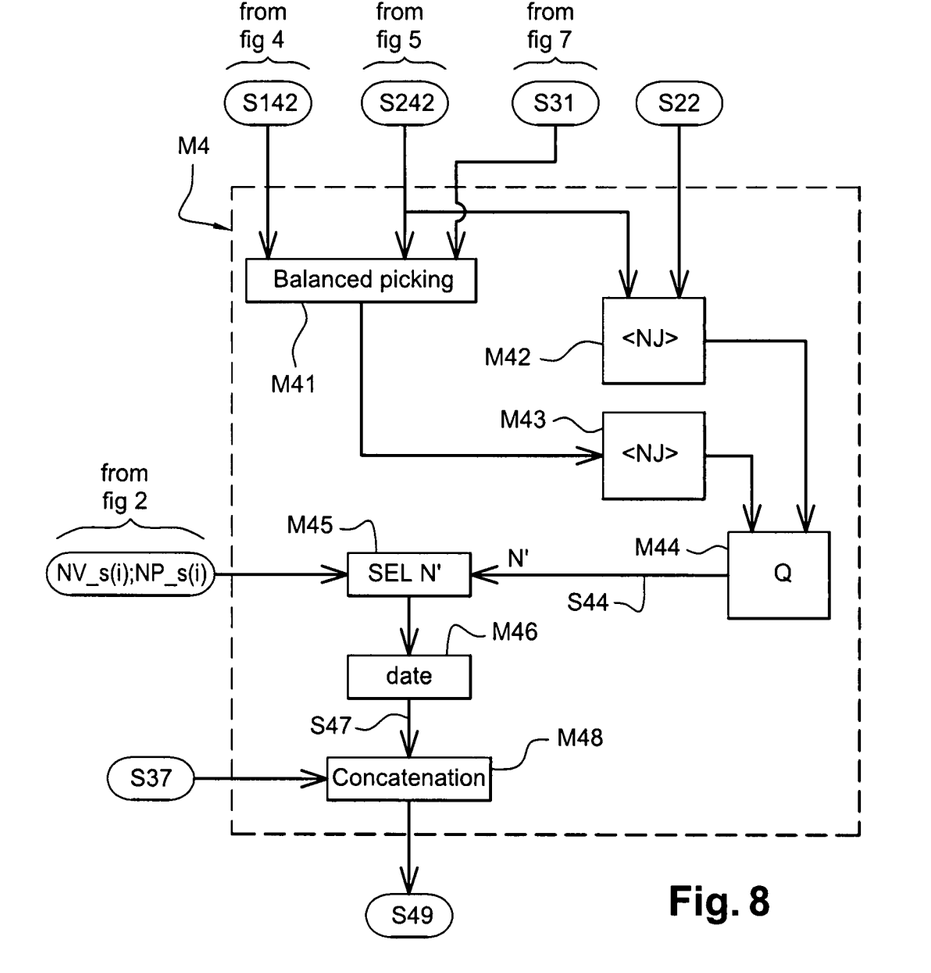
FIG. 8 represents an embodiment of a fourth component of the audience measurement system of the present invention according to a particular embodiment.

In FIG. 8 is represented a particular embodiment of the fourth component M4 of the audience measurement system according to the invention.

The fourth component M4 receives as input the lists or files S142 emanating from the first component M1 (FIG. 5), S242 emanating from the second component M2 (FIG. 6), S31 emanating from the third component (FIG. 7) and $\{NV\_s(i), NP\_s(i); i; s\}$ grouping together the number of visits $NV\_s(i)$ and the number of pages viewed $NP\_s(i)$ on each site s for each user i of the sample analysed on the basis of an audience measurement system centred on the user like that represented in FIG. 2.

The fourth component M4 comprises a first module M41 executing a balanced picking for selecting users belonging to the domain ALNE (see FIG. 5). The first module M41 of the fourth component executes a balanced picking with the aid of the same procedure as that indicated for the picking of the counterparts of the second module M32 of the third component M3 that were mentioned above. The first module M41 for selecting the users receives as input the lists S142 emanating from the first component M1 and S242 emanating from the second component M2 and the file S31 emanating from the third component. It produces at its output S41 a list of the individuals selected on the basis of a balanced picking.

The fourth component M4 comprises a second module M42 which makes it possible to determine the mean number of connection days measured by an audience measurement system centred on the user for the modalities such as established in M22 so as to obtain a distribution of the connection frequencies in accordance with that emanating from the first component M1 on the population of the domain DT determined as has been represented and explained with the aid of FIG. 5, the said measurements being executed with the aid of the second component M2 as has been explained.

The fourth component M4 comprises a third module M43 which produces the calculation of the mean number of connection days of the individuals belonging to the domain ALNE (see FIG. 5) in the other places on the one hand and in the zone DT on the other hand.

The data produced at the output of the second M42 and third M43 modules are connected to the inputs of a fourth module M44 of the fourth component M4 which calculates the ratio of the mean numbers of connection days calculated and provided to these inputs. The output of the fourth module M44 for calculating ratios transmits a ratio datum S44 to the input of a fifth module M45 of the fourth component M4 which executes the random selection of a determined number of record within the initial audience data file inscribed in an initial database $\{NV\_s(i), NP\_s(i); i; s\}$ which is connected to it at input.

The fourth component M4 finally comprises a sixth module M46 which produces a modification of the date of each record associated with the random selection produced by the fifth module M45 on a pseudo deterministic procedure.

The modified records S47 are thereafter transmitted to an input of the module M48 which executes the concatenation of the modified records S47 with the individual data S37 of type $\{NV\_s(i), NP\_s(i); i; s\}$, produced at the output of the third component M3.

New files S49 of individual data integrating the use of the Internet in the domain AL of the population of the individuals of the zone ALNE is obtained at the output of the fourth component M4 (see FIG. 8).

Figure 9:
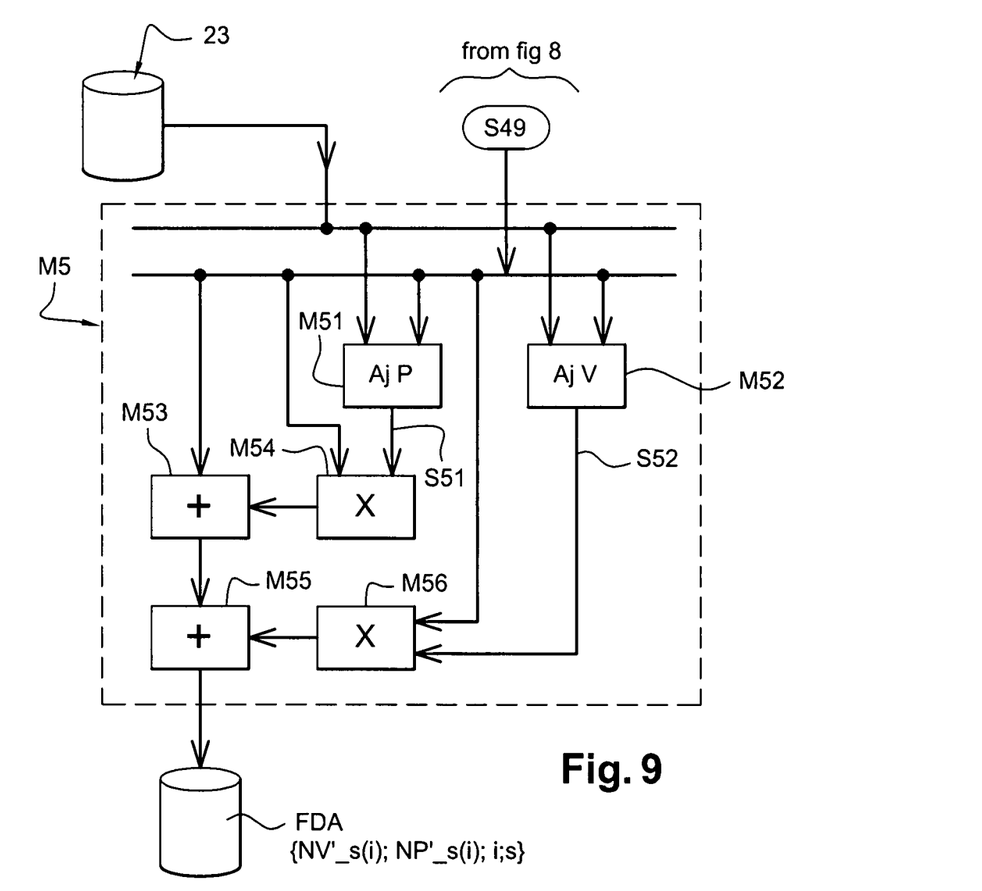
FIG. 9 represents an embodiment of a fifth component of the audience measurement system of the present invention according to a particular embodiment.

In FIG. 9 is represented a fifth component M5 of the audience measurement system according to the invention. The fifth component M5 receives as input the statistical reports emanating from the traffic measurement system centred on the site and which are stored in the database 23 already described in the preceding FIG. 1, as well as the output S49 of the fourth component M4 described with the aid of the preceding FIG. 8. The fifth component M5 produces at the output a file of individual data FDA of type $\{NV'\_s(i), NP'\_s(i); i; s\}$ in which the totals of pages viewed and of visits coincide with the totals of pages viewed and of visits, stored in the database 23.

The fifth component M5 comprises a first module M51 which executes the calculation of an adjustment coefficient for the number of pages viewed for a determined site s, for a determined individual k and for a determined date j. In a particular embodiment, the adjustment coefficient for the site s, BETA_S, calculated by the first module M51 is given by the relation:

$$\text{BETA\_s} = \frac{\text{t\_site}(NP\_s)}{\text{Sum}(\text{Sum}(NP\_s(k,\ j);\ j);\ k)}$$

in which a double sum is carried out firstly over the set of dates j of the period considered, then over the set of individuals k on the data S49 at the output of the fourth component M4, and in which the numerator t_site (NP_s) consists of the total of pages viewed for the site s stored in the database 23.

The fifth component M5 comprises a second module M52 which executes the calculation of an adjustment coefficient for the number of visits of the site s, for a determined individual k and for a determined date j. In a particular embodiment, the adjustment coefficient for the site s, GAMMA_s, calculated by the second module M52 is given by the relation:

$$\text{GAMMA\_s} = \frac{\text{t\_site}(NV\_s)}{\text{Sum}(\text{Sum}(NV\_s(k,\ j);\ j);\ k)}$$

in which a double sum is carried out firstly over the set of dates j of the period considered, then over the set of individuals k on the data S49 at the output of the fourth component M4, and in which the numerator t_site (NV_s) consists of the total of visits made on the site s stored in the database 23.

The output S51 of the first module M51 and the output S52 of the second module M52 are communicated to a first input of the respective multipliers M54 and M56 which receive in a second input the file of individual data of type {NV_s(i), NP_s(i); i; s} output by the module M48 of the fourth component. The respective multipliers M54 and M56 make it possible to calculate the number of visits NV'_s(i) and the number of pages viewed NP'_s(i) for each user i by multiplying NV_s(i) by GAMMA_s and NP_s(i) by BETA_S.

The fifth component M5 comprises a third module M53 which adds the field NP'_s(i) provided to a first input of the third module M53, to the file S49 output by the fourth component M4 provided to a second input of the third module M53.

Likewise, the fifth component M5 comprises a fourth module M54 which adds a field NV'_s(i) provided to a first input of the fourth module M54, to the file output by the third module M53.

The individual data produced at the output of the fifth component M5 are then recorded in an audience measurement database FDA of the audience measurement system of the invention.

The output database FDA of the audience measurement system of the invention therefore comprises the whole set of individual data corresponding to the users of the predetermined user sample processed by an audience measurement system centred on the user of the state of the art, but to which have been added data making it possible to take account in particular of the domains of intersection of the zones characterizing the users of the predetermined sample of users.

The invention claimed is:

1. A system for measuring audience on a collection of networks comprising:
at least one communications network, on which a plurality of media are broadcast or made available and in which a plurality of predetermined users is associated with a first suite of machines connected to a network of the said collection of networks, in a first zone of use and with at least one second suite of machines connected to a network of the said collection of networks, in a second zone of use;
a calculation means (M1-M5) to produce, on the basis of the first suite of machines (DT), user counterparts for at least one other zone of use (AL) so as to reconstitute the plurality of the users and of the zones of use;
a first component (M1) means for producing scaling data (S141 and S142) on the basis of a declarative measurement of use of the medium by zone of use over a time period that is given on the basis of a sample of users of the medium (DTE, ALE, ALNE); and
a second component (M2) means (M21, M22, M23) for producing a list of theoretical frequencies of use of the medium on the other zones of use on the basis of the scaling data produced by the said first component and on the basis of data {NV_s(i), NP_s(i); i, s} grouping together the number of visits NV_s(i) and the number of pages viewed NP_s(i) on the site s for each user i of the sample, the base being produced by an audience measurement system centered on the user.

2. The system according to claim 1, further comprising:
a third component (M3) which processes the data (S141, S241) emanating from the first (M1) and second (M2) components so as to create counterparts of the users (ALE) situated outside of the zone of use (DT) covered by an audience measurement system centered on the user, the data emanating from the third component integrating the audience data from the other zones of use (AL) of the exclusive users of the other zones of use (AL) not covered by an audience measurement system centered on the user (DT).

3. The system according to claim 2, further comprising:
a fourth component (M4) which processes the data (S142, S242) emanating from the first (M1) and second (M2) components so as to determine the users (ALNE) situated at the intersection of the zone of use (DT) covered by an audience measurement system centered on the user and of the other zones of use (AL) and in calculating a survey rate allowing the random selection of records of the database of the users, the data emanating from the fourth component integrating the audience data from the other zones of use of the users situated at the intersection of the zone of use covered by an audience measurement system centered on the user (DT) and of the other zones of use (AL).

4. The system according to claim 3, further comprising:
a fifth component (M5) for carrying out a tuning of the audience results which comprises a means (M51, M52) for carrying out adjustments of individual data emanating from the sample of users of the group of predetermined users and a means (M53-M56) for integrating them with the data of the initial database emanating from an audience measurement system centered on the user so as to produce a database (FDA) measuring audiences of a plurality of Internet sites taking account of the set of domains of use of the medium.

* * * * *